United States Patent [19]

Kyoya et al.

[11] Patent Number: 5,137,003
[45] Date of Patent: Aug. 11, 1992

[54] SUPERCHARGED PRESSURE CONTROL VALVE APPARATUS

[75] Inventors: Michio Kyoya; Atsushi Hagita, both of Sagamihara; Sotsuo Miyoshi, Sanda, all of Japan

[73] Assignees: Mitsubishi Denki K.K.; Mitsubishi Jukogyo K.K., both of Tokyo, Japan

[21] Appl. No.: 523,531

[22] Filed: May 15, 1990

[30] Foreign Application Priority Data

May 19, 1989 [JP] Japan ................................ 1-127151
May 19, 1989 [JP] Japan ................................ 1-127152
Aug. 5, 1989 [JP] Japan ................................ 1-203127

[51] Int. Cl.⁵ .............................................. F02B 37/12
[52] U.S. Cl. .................................... 123/564; 137/510; 137/859; 60/611
[58] Field of Search ................... 60/611, 600, 601; 123/564; 137/510, 859

[56] References Cited

U.S. PATENT DOCUMENTS 4,493,339  1/1985  Porter, Jr. ........................... 137/510
4,517,803  5/1985  Jamison ............................... 60/611

FOREIGN PATENT DOCUMENTS 2313734  10/1974  Fed. Rep. of Germany ...... 137/859
3236564   4/1984  Fed. Rep. of Germany ...... 123/564
1-58723   4/1989  Japan .

Primary Examiner—Leonard E. Smith
Attorney, Agent, or Firm—Sughrue, Mion, Zinn, Macpeak & Seas

[57] ABSTRACT

In a supercharged pressure control valve apparatus of an internal combustion engine, a housing of supercharger has first and second by-pass air paths; a valve sheet formed on an end of the second by-pass air path; a rubber diaphragm having thick sealing part of convex and concave sectional shape at its outer periphery; a valve disc fixed to the moving part of the diaphragm and opening closing the first and the second by-pass air paths responding to movement of the diaphragm; and a casing of the valve directly fixed on the housing by sandwiching the outer periphery of the diaphragm.

3 Claims, 3 Drawing Sheets

SUPERCHARGED PRESSURE CONTROL VALVE APPARATUS

BACKGROUND OF THE INVENTION

1. Field of the Invention

The present invention relates to a valve apparatus and especially relates to a supercharged pressure control valve apparatus for regulating abnormal pressure rise in an upstream part of an air suction path of a throttle valve, which may occur at closing the throttle valve for deceleration.

2. Description of the Prior Art

A conventional supercharged pressure control valve apparatus used in an internal combustion engine, for example, shown in Published Unexamined Japanese Utility Model Application Hei 1-58723 is described with reference to FIG. 3. FIG. 3 is a cross-sectional view showing the conventional supercharged pressure control valve apparatus. In FIG. 3, the conventional supercharged pressure control valve apparatus comprises: an air cleaner 1 serving as an air sucking portion; suction pipes 2 and 2 serving as paths of suction air from the air cleaner 1; a supercharger 3 connected to the suction pipes 2 and 2; a throttle valve 6 for controlling amount of the suction air; a decompression path 8; and a supercharged pressure control valve 9. In the suction pipe 2, the upstream part 4 of the supercharger 3 is a first suction air path and the downstream part 5 of the supercharger 3 is a second suction air path. The decompression path 8 connects the first and second suction air paths 4 and 5. The supercharged pressure control valve 9 controls the pressure of the supercharged pressure in the second suction air path 5 by opening and closing the decompression path 8.

Details of the supercharged pressure control valve 9 is described. The supercharged pressure control valve 9 comprises: a cylindrical housing 10; a second path formed in a wall part of the housing 10 for introducing the supercharged air in the second suction air path 5 to a second pressure chamber 29; and a flange 13 formed on the lower end of the housing 10 and mounted on a mounting part 14 of the suction pipe 2 serving as the second suction air path 5. Furthermore, a valve seat 15 is formed on an inner wall of the housing 10 and around an opening 13a of the flange 13. A nipple part 16 of the housing 10 serving as an inlet and an outlet of the suction air is connected to the suction pipe 2 serving as the first suction air path 4. A disc-shaped diaphragm 17 is sealed at its outer periphery by a cup-shaped casing 18 and circular periphery of top end of the housing 10. A first pressure chamber 19 is formed by the diaphragm 17 and the casing 18. A first path 20 connects an output port 21 and a nipple 22 for introducing the supercharged air in a third suction air path 7 to the first pressure chamber 19. Plate-shaped holders 23a and 23b sandwiches the center part of the diaphragm 17 and an end of a rod 24 is connected at the center of the holders 23a and 23b. The valve disc 25 for opening and closing the decompression path 8 is connected to the other end of the rod 24 and formed to contact with the valve seat 15. The rod 24 is slidably born by a bearing 26 and the bearing 26 is supported by a bearing holder 27. A spring 28 is compressedly provided between the casing 18 and the holder 23a for supplying an elastic force to the inside bottom of the diaphragm 17 in a direction of close the valve 9. The second pressure chamber 29 is formed between the diaphragm 17 and the bearing holder 27 and connected to the second suction air path 5 by the second path 11. A throttle 30 is formed in the second path 11 which serves as an air resistance for making a transfer lag of the pressure in the second path 11.

In the above-mentioned conventional supercharged pressure control valve apparatus, a seal member 23b is necessary to keep the sealing of the casing 18 and the housing 10. Thereby the number of parts and components constituting the apparatus is great and the workability to assemble the casing 18 on the housing 10 is not good. Furthermore, the supercharger 3 and the supercharged pressure control valve 9 are independently disposed and connected by the suction pipe 2. As a result, a large space is necessary to provide the conventional apparatus. Furthermore the conventional apparatus needs plural pipes for making the by-pass air path (decompression path 8) and thereby, the cost for making the conventional apparatus is expensive.

SUMMARY OF THE INVENTION

Purpose of the present invention is to provide an improved supercharged pressure control valve apparatus, in which the size thereof is made small and the cost for making the apparatus is reduced.

A supercharged pressure control valve apparatus in accordance with the present invention comprises:

a housing having plural air paths therein;

a casing fixed on the housing;

a diaphragm having a thick sealing part at its outer periphery and directly sandwiched between the casing and the housing; and a valve disc fixed to moving part of the diaphragm and for opening and closing the air paths by movement of the diaphragm.

In the supercharged pressure control valve apparatus, the outer periphery of the diaphragm having thick convex and concave section which is made of, for example, rubber is directly sandwiched by the housing and the casing, so that the outer periphery of the diaphragm seals the gap between the casing and the housing.

DESCRIPTION OF THE PREFERRED EMBODIMENTS

Figure 1:
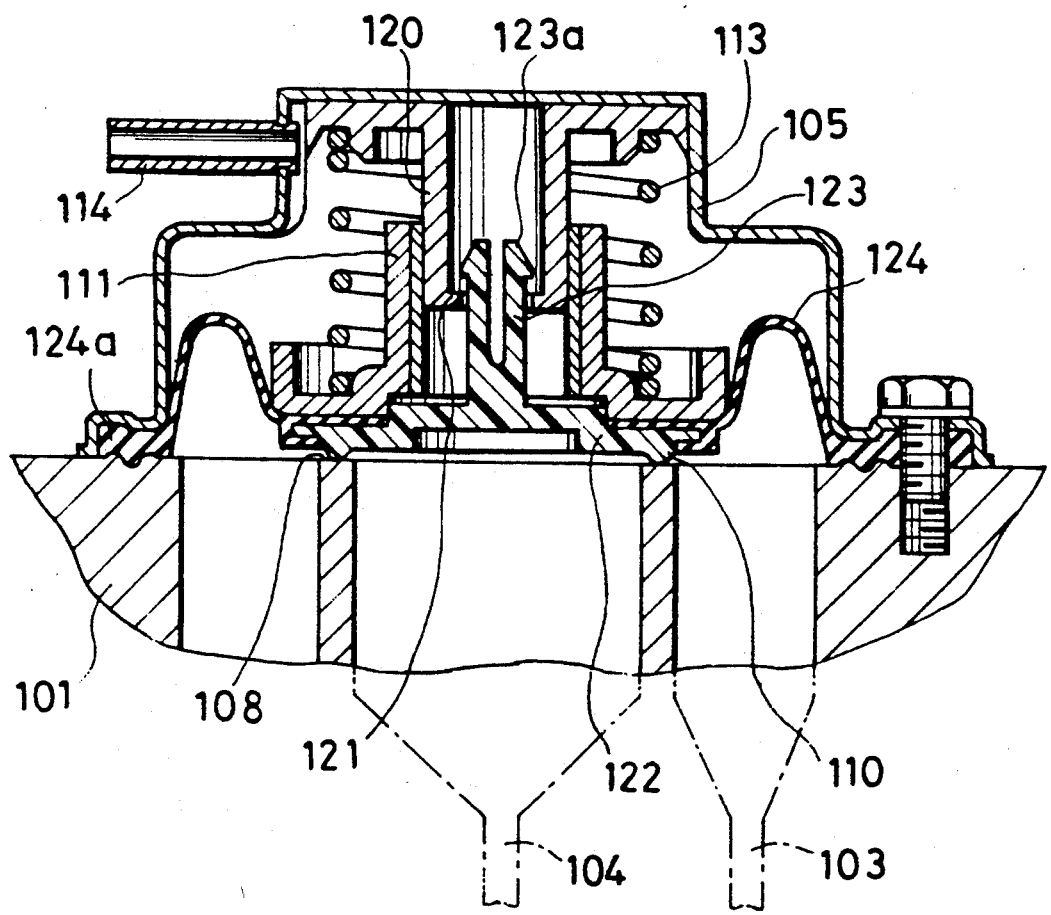
FIG. 1 is a cross-sectional side view showing preferred embodiment of a supercharged pressure control apparatus in accordance with the present invention.

A first preferred embodiment of a supercharged pressure control valve apparatus in accordance with the present invention is described referring to FIG. 1.

In FIG. 1, the supercharged pressure control valve apparatus in accordance with the present invention comprises: a housing 101 of a supercharger having therein a first and a second by-pass air paths 103 and 104; a casing 105 fixed on the housing 101 by screws; a valve seat 108 formed at an end of the second by-pass air path 104; a valve disc 122 having a seal part 110 which has a convex section for closing the second by-pass air path 104 by contacting with the valve seat 108;

a pipe-shaped holder 111 fixed on the valve disk 122 in the casing 105 for holding the valve disc 122; a pipe-shaped support 120 fixed on the ceiling of the casing 105 and outer surface thereof being slidably coupled with the inner surface of the holder 111 in a manner to make the valve disc 122 slidably move in a vertical direction; a compression spring 113 provided between the support 120 and the holder 111; and a nipple 114 connected to a downstream part of a throttle valve which is provided in, for example, the first by-pass air path 103 in a vertically lower position of the apparatus (not shown in the figure because of obvious). When the valve disk 122 is moved in an upper direction against the elastic force of the spring 113, the first by-pass air path 103 and the second by-pass air path 104 are connected to be passed by an air current.

A bottom hole 121 is formed on the bottom end of the support 120 and the top end of a center shaft 123 of the valve disc 122 has a wedge-shaped snap-fit part 123a. The shaft 123 loosely couples with the hole 121 of the support 120. A diaphragm 124 is integrated with the valve disc 122 by baking treatment. Outer periphery 124a of the diaphragm 124 is made thick and has convex and concave section and it is directly sandwiched by the casing 105 and the housing 101.

Figure 3:
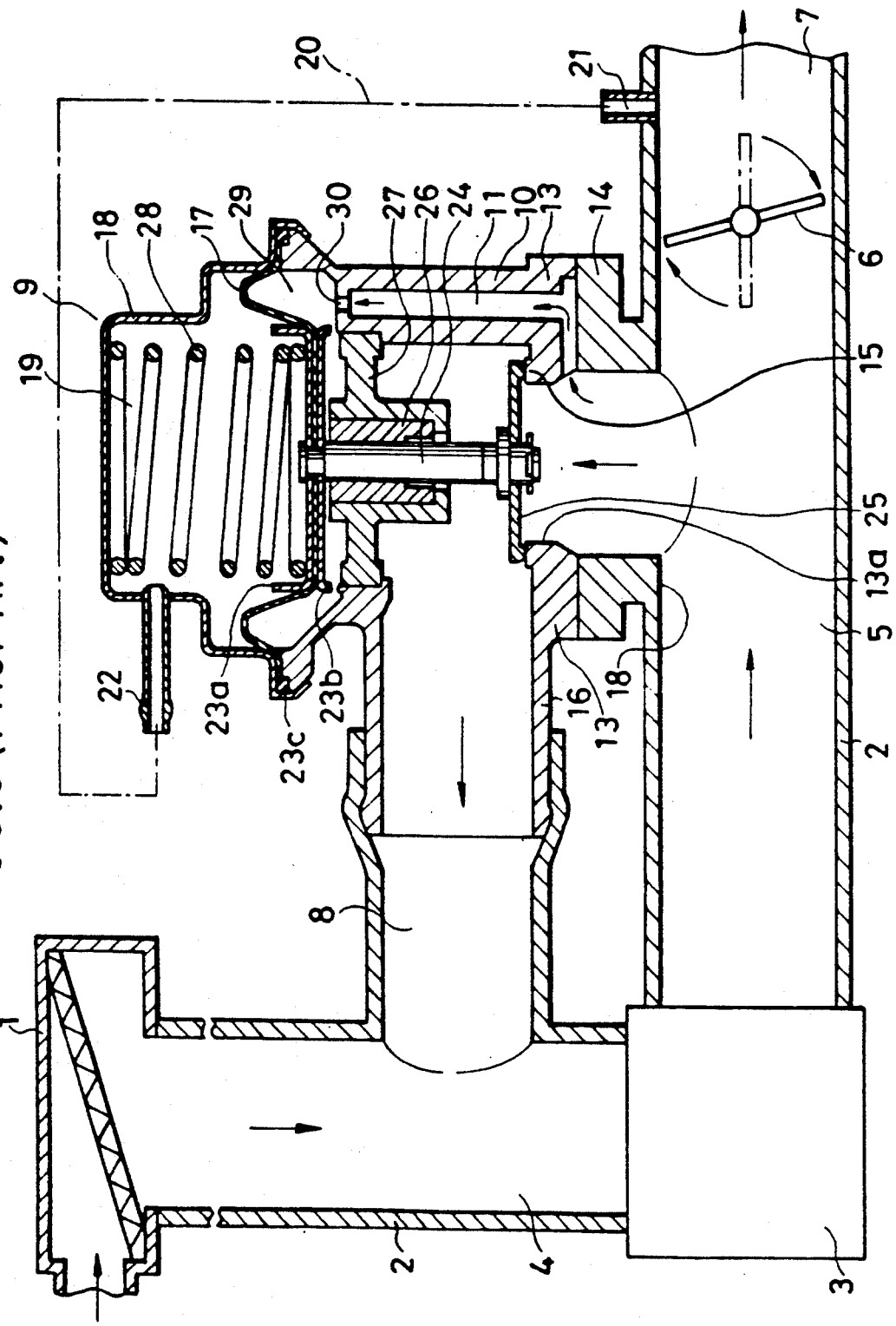
FIG. 3 is a cross-sectional side view showing the constitution of the conventional supercharged pressure control valve apparatus.

In the above-mentioned supercharged pressure control valve apparatus, the outer periphery 124a of the diaphragm 124 seals the gap between the casing 105 and the housing 101, thereby the conventional seal member 23c shown in FIG. 3 is not necessary. Furthermore, the shaft 123 of the valve disc 122 involves with the hook part 121 of the support 120, so that the seal part 110 of the diaphragm 124 may not fall out from the valve sheet 108.

Figure 2:
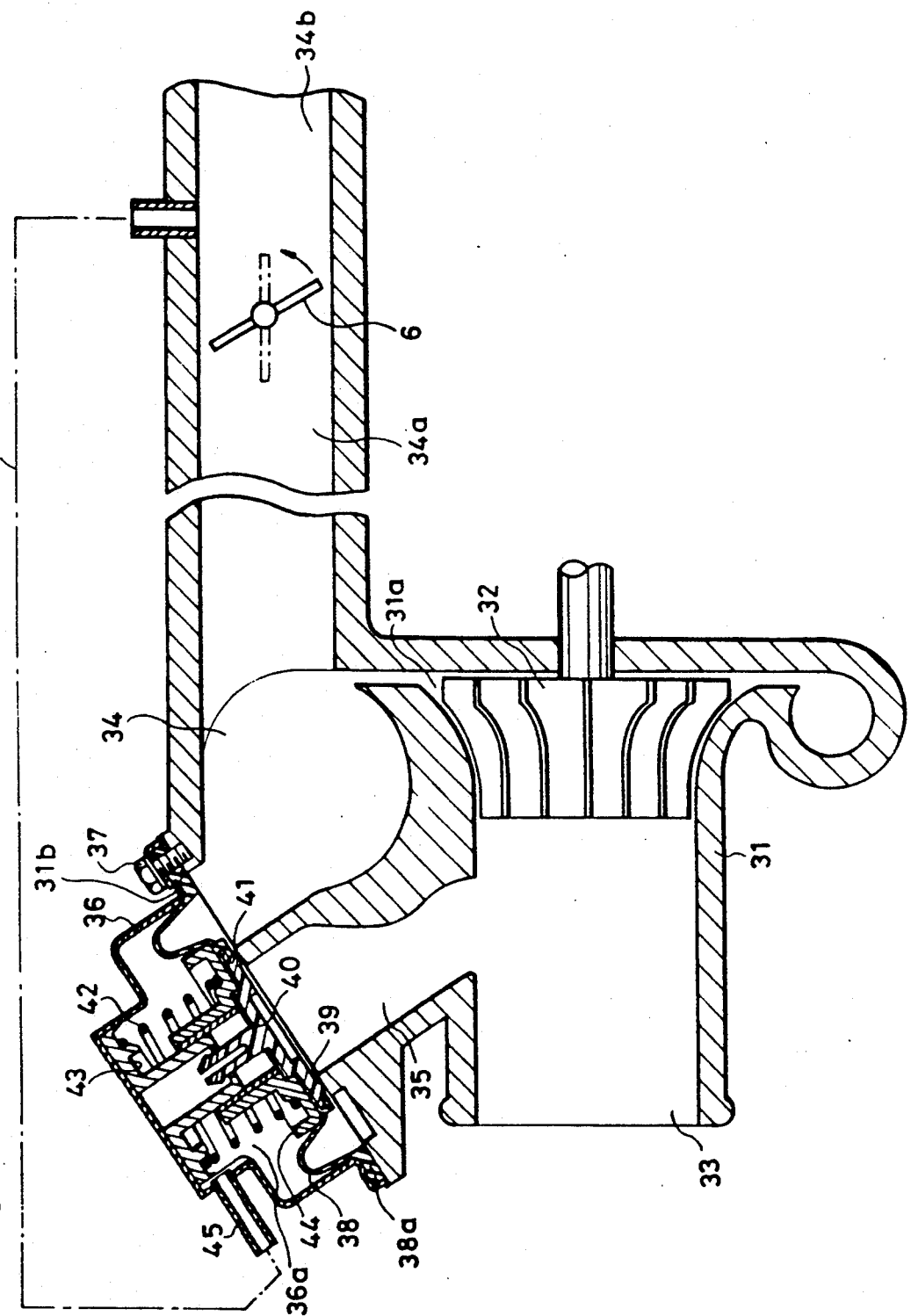
FIG. 2 is a cross-sectional side view showing another preferred embodiment of a supercharge pressure control valve apparatus in accordance with the present invention.

Another preferred embodiment of the supercharged pressure control valve apparatus is described referring to FIG. 2. In this embodiment, a supercharged pressure control valve apparatus is integrated in a supercharger.

In FIG. 2, a housing 31 of the supercharger has an air suction path 33 in which the sucked air passes, a first and a second by-pass ways 34 and 35. A fan 32 is rotatably born in a room 31a of the housing 31.

In the supercharged pressure control valve apparatus, a casing 36 is fixed on the housing 31 by screw 37; a diaphragm 38 made of rubber has a thick convex and concave section at its outer periphery 38a, which is fixed by sandwiching between the casing 36 and the housing 31 for sealing a gap therebetween. A valve seat 39 is formed on an end of the second by-pass air path 35. The valve seat 39 and a mounting surface 31b of the housing 31, on which the diaphragm 38 is mounted, are formed on the same plane.

A valve disc 40 made of resin is baked so as to be integrated with the diaphragm 38. A sealing part 41 of the valve disc 40 touches the valve seat 39 for closing the second by-pass air path 35. A spring 42 is provided between a support 43 and a holder 44 in the casing 36. A nipple 45 is formed on the upper part of the casing 36 connected to a downstream part 34b of a throttle valve 6 which is provided, for example, in the first by-pass air path 34 for introducing the supercharged air in the first by-pass air path 34 to a pressure chamber 36a in the casing 36 by a path 20.

Operations of the above-mentioned embodiment of the supercharged pressure control valve apparatus in accordance with the present invention is described. For medium load driving or heavy load driving of an automobile, the throttle vale 6 is substantially fully opened. Pressures in both an air suction path on the downstream part 34b of the throttle valve 6 and the air suction path 33 are highly pressed due to the supercharging effect of the fan 32 of the supercharger. The pressures in both sides of the diaphragm 38 are the same and positive pressures. As a result, a force in a direction to close the valve disc 40 by the spring 42 is applied to the diaphragm 38 and the valve disc 40 is completely closed by contacting of the sealing part 41 with the valve seat 39.

When the state of the automobile engine is changed to the deceleration driving in which the throttle valve 6 is suddenly closed from the above-mentioned medium load driving or heavy load driving, the pressure in the downstream part 34b of air suction path of the throttle valve 6 is changed to a negative high pressure and that in the casing 36 also changes to a great negative high pressure. The pressure in the second by-pass air path 35 is raised to a high positive pressure so far as the fan 32 rotates. As a result, the valve disc 40 is opened against the force of the spring 42 and the supercharged air circulates in the first and second by-pass air paths 34 and 35. Therefore, undesirable abnormal pressure rise in the upstream part 34a of the throttle valve 6 is prevented.

As mentioned above, in the supercharged pressure control valve apparatus in accordance with the present invention, the outer periphery of the diaphragm made of rubber and having thick convex and concave section 124 or 38 is directly sandwiched by the housing 101 or 31 and the casing 105 or 36. Hence the conventional sealing member is omitted, and the number of parts constituting the apparatus is reduced and the workability to assemble the apparatus is improved.

Furthermore, since the supercharger and the supercharged pressure control valve are integrated in one body, the conventional pipes for connecting the supercharger and the supercharged pressure control valve are not necessary any more. Thereby, the space necessary for the apparatus is to be provided decreases and the cost to make the apparatus is reduced.

Still furthermore, since the part where the diaphragm 124 or 38 is fixed and the part of the valve sheet 108 or 39 of the housing 101 or 31 are on the same plane, the cost to make the housing 101 or 31 low and the work to assemble the supercharged pressure control valve on the supercharger is easy.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A supercharged pressure control valve apparatus comprising:
  a housing having plural air paths therein;
  a casing fixed on said housing;
  a diaphragm having a thick sealing part at its outer periphery and directly sandwiched between said casing and said housing; and
  a movable valve disc fixed directly to a moving part of an inner periphery of said diaphragm for opening and closing said air paths by moving said diaphragm.

2. A supercharged pressure control valve apparatus comprising:
  a fan of a supercharger;

a housing having a room for rotatably containing said fan, a suction air path in which air sucked and supercharged by rotation of said fan passes and a first and a second by-pass air paths, either one of which is connected to said suction air path;

a casing fixed as its sandwiching outer periphery of a diaphragm to said housing; and a movable valve disc means for admitting circulation of supercharged air between said first and second by-pass air paths when a predetermined pressure difference is applied to said diaphragm, said movable valve disc means being fixed directly to a moving part of an inner periphery of said diaphragm such that said first and second by-pass air paths are connected by movement of said diaphragm.

3. A supercharged pressure control valve apparatus comprising:

a fan of a supercharger:

a housing having a room for rotatably bearing said fan, a suction air path in which air sucked and to be supercharged by rotation of said fan passes a first and a second by-pass air paths, one of which is connected to said suction air path, a valve sheet formed on an end of said second by-pass air path and a mount face formed on the same plane as said valve sheet;

a diaphragm made of rubber, having thick sealing part at an outer periphery thereof and disposed on said mount surface;

a casing fixed for sandwiching said sealing part of said diaphragm on said mount surface of said housing;

a movable valve disc means for admitting circulation of supercharged air between said first and second by-pass air paths when a predetermined pressure difference is applied to said diaphragm, said movable valve disc means being fixed directly to a moving part of an inner periphery of said diaphragm such that said first and second by-pass air paths are connected by movement of said diaphragm.

* * * * *